United States Patent
Bean et al.

(10) Patent No.: US 10,129,291 B2
(45) Date of Patent: Nov. 13, 2018

(54) ANOMALY DETECTION TO IDENTIFY MALWARE

(71) Applicant: McAfee, LLC, Santa Clara, CA (US)

(72) Inventors: James Bean, Portland, OR (US); Joel R. Spurlock, Portland, OR (US)

(73) Assignee: McAfee, LLC, Santa Clara, CA (US)

( * ) Notice: Subject to any disclaimer, the term of this patent is extended or adjusted under 35 U.S.C. 154(b) by 5 days.

(21) Appl. No.: 14/752,893

(22) Filed: Jun. 27, 2015

(65) Prior Publication Data

US 2016/0381041 A1    Dec. 29, 2016

(51) Int. Cl.
H04L 29/06   (2006.01)

(52) U.S. Cl.
CPC ........ H04L 63/145 (2013.01); H04L 63/1416 (2013.01); H04L 63/1425 (2013.01)

(58) Field of Classification Search
CPC ............... H04L 63/145; H04L 63/1425; H04L 63/1416
USPC ........................................................ 726/23
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 8,225,406 B1* | 7/2012 | Nachenberg | G06F 21/577 726/22 |
| 8,516,576 B2* | 8/2013 | Figlin | H04L 63/1408 726/22 |
| 8,561,180 B1* | 10/2013 | Nachenberg | G06F 21/562 726/22 |
| 2007/0050777 A1* | 3/2007 | Hutchinson | G06F 11/0709 718/104 |
| 2008/0168560 A1* | 7/2008 | Durie | H04L 63/1408 726/23 |
| 2011/0099634 A1* | 4/2011 | Conrad | H04L 63/1425 726/24 |
| 2012/0246727 A1 | 9/2012 | Elovici et al. | |
| 2012/0304288 A1 | 11/2012 | Wright et al. | |
| 2013/0031599 A1 | 1/2013 | Luna et al. | |
| 2014/0059684 A1 | 2/2014 | Wyschogrod et al. | |
| 2016/0099963 A1* | 4/2016 | Mahaffey | H04L 63/1433 726/25 |

FOREIGN PATENT DOCUMENTS

EP    2278516 A1    1/2011

OTHER PUBLICATIONS

International Search Report and Written Opinion in International Application No. PCT/US2016/033978, dated Aug. 26, 2016, 12 pages.

* cited by examiner

*Primary Examiner* — Teshome Hailu
(74) *Attorney, Agent, or Firm* — Patent Capital Group

(57) ABSTRACT

Particular embodiments described herein provide for an electronic device that can be configured to monitor activities of objects in a system, compare the monitored activities to metadata for the system, and identify low prevalence outliers to detect potentially malicious activity. The monitored activities can include an analysis of metadata of the objects in the system to identify polymorphic threats, an object reuse analysis of the system to detect an object reusing metadata from another object, and a filename analysis of the system.

15 Claims, 7 Drawing Sheets

ANOMALY DETECTION TO IDENTIFY MALWARE

TECHNICAL FIELD

This disclosure relates in general to the field of information security, and more particularly, to anomaly detection to identify malware.

BACKGROUND

The field of network security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, and/or assisting with distributed denial of service attacks, sending out spam or malicious emails from the host computer, etc. Hence, significant administrative challenges remain for protecting computers and computer networks from malicious and inadvertent exploitation by malicious software and devices.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

Figure 1A:
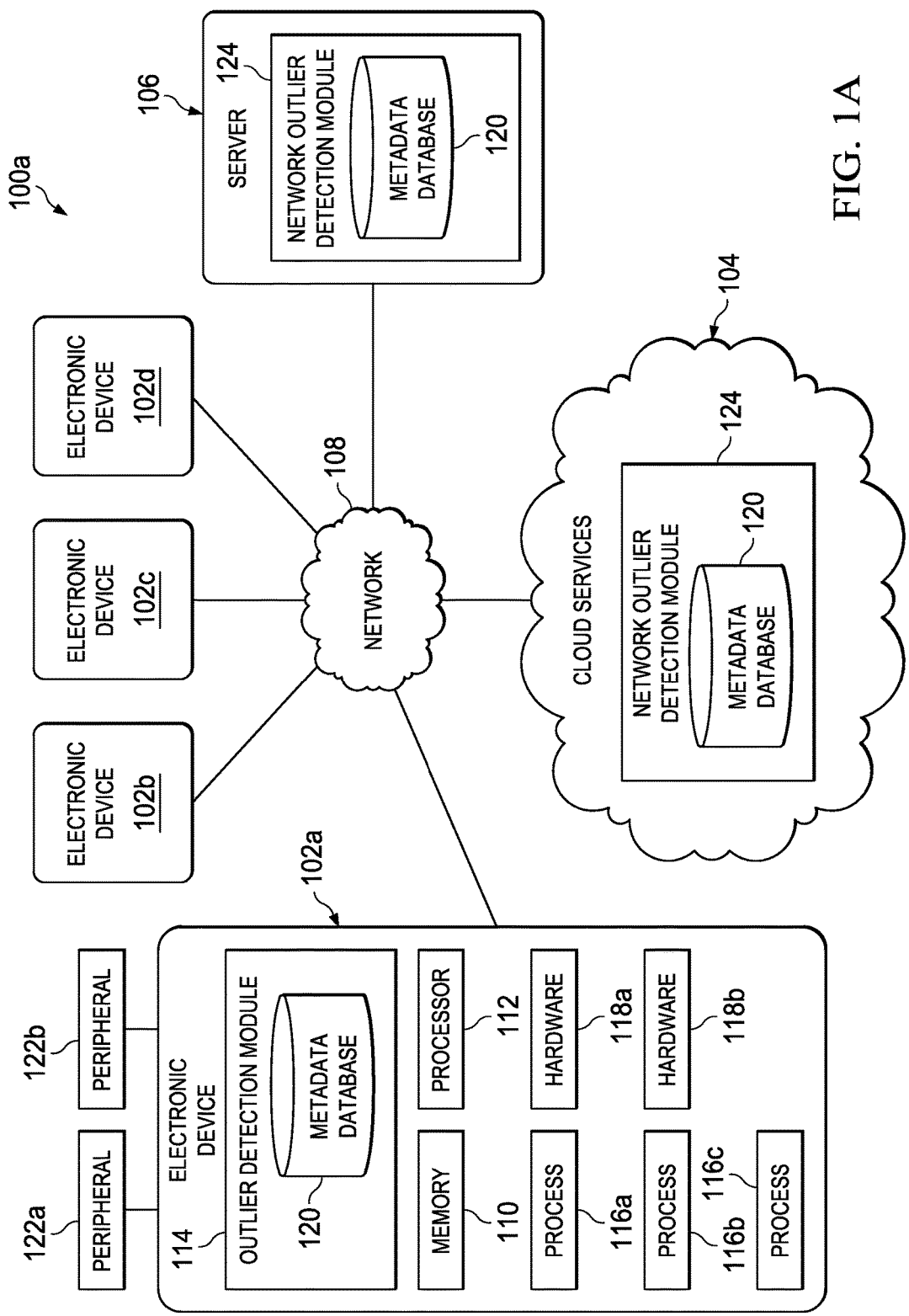
FIG. 1A is a simplified block diagram of a communication system for anomaly detection to identify malware, in accordance with an embodiment of the present disclosure.

FIG. 1A is a simplified block diagram of a communication system 100a for anomaly detection to identify malware, in accordance with an embodiment of the present disclosure. As illustrated in FIG. 1A, communication system 100a can include electronic devices 102a-102d, cloud services 104, and a server 106. One or more electronic device 102a-102d can each include memory 110, a processor 112, an outlier detection module 114, one or more processes 116a-116c, and a plurality of hardware 118a and 118b. Outlier detection module 114 can include metadata database 120. One or more peripherals 122a and 122b may be connected to one or more of electronic devices 102a-102d. Cloud services 104 and server 106 can each include a network outlier detection module 124. Network outlier detection module 124 can include metadata database 120. Electronic devices 102a-102d, cloud services 104, and server 106 may be in communication with each other using network 108.

Figure 1B:
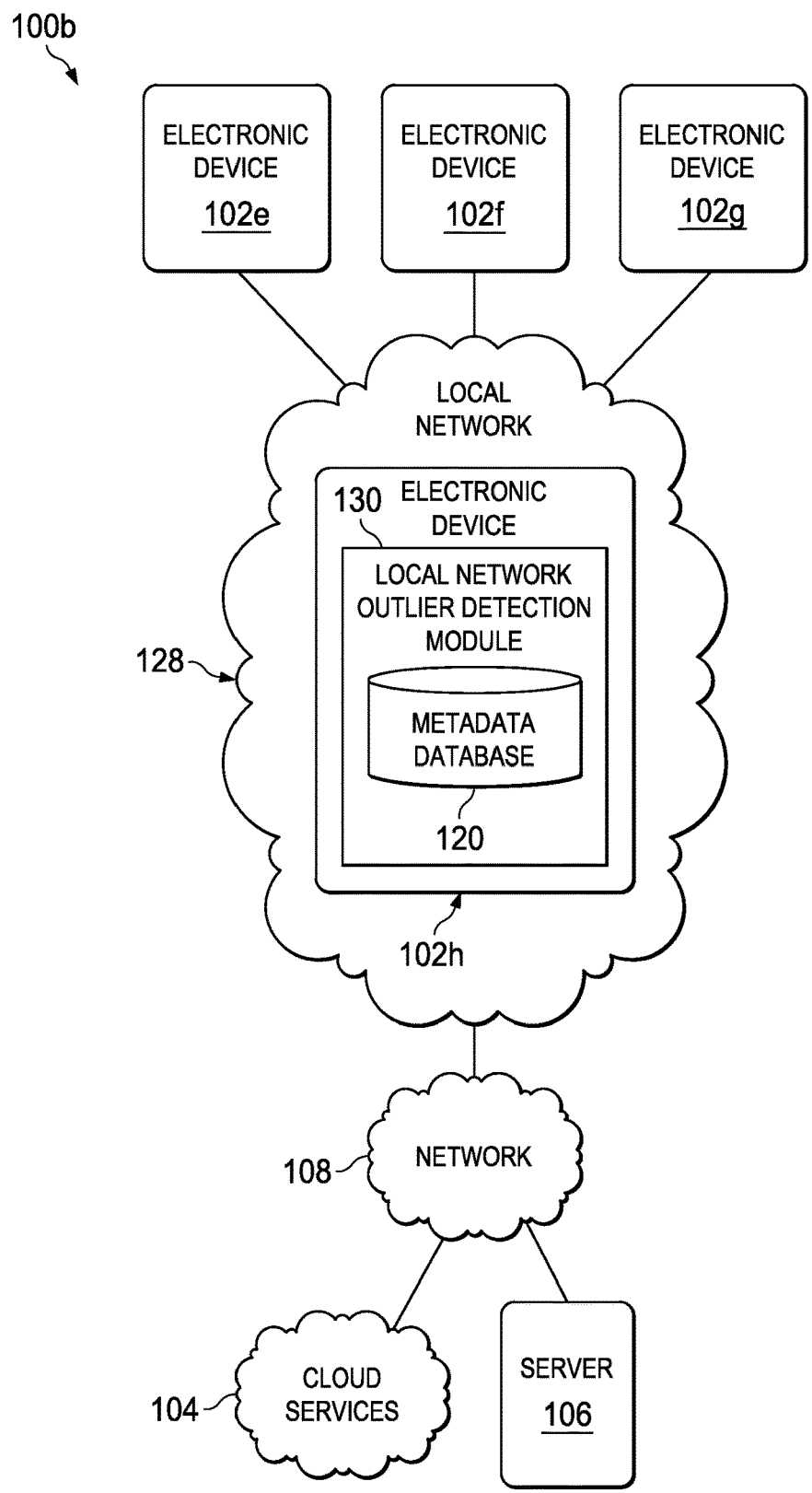
FIG. 1B is a simplified block diagram of a portion of a communication system for anomaly detection to identify malware, in accordance with an embodiment of the present disclosure.

FIG. 1B is a simplified block diagram of a communication system 100b for anomaly detection to identify malware, in accordance with an embodiment of the present disclosure. As illustrated in FIG. 1B, communication system 100b can include electronic devices 102e-102g, cloud services 104, and server 106. Electronic devices 102e-102g may be in communication with each other using a local network 128. Local network 128 can include an electronic device 102h. Electronic device 102h can include a local network outlier detection module 130. Local network outlier detection module 130 can include metadata database 120. Local network 128 may be in communication with cloud services 104 and server 106 using network 108.

In example embodiments, communication system 100a and 100b can be configured for anomaly detection to identify malware in accordance with an embodiment of the present disclosure. Outlier detection module 114, network outlier detection module 124, and local network outlier detection module 130 can be configured to understand the behavior of devices and assess a device reputation value for each device on the network. Communication system 100a and 100b also be configured to identify a suspicious application or activity based on the content in network traffic associated with the application or activity. For example, communication system 100a and 100b can be configured monitor activities of a system, compare the monitored activities to metadata for the system and identify low prevalence outliers to detect potentially malicious objects. For example, outlier detection module 114 can be configured to understand the behavior of processes 116a-116c, hardware 118a and 118b, and peripherals 122a and 122b and identify suspicious activity by recognizing low prevalence outliers or anomaly behavior from processes 116a-116c, hardware 118a and 118b, and peripherals 122a and 122b. Also, network outlier detection module 124 can be configured to understand the behavior of electronic device 102a-102d and identify suspicious activity by recognizing low prevalence outliers or anomaly behavior from electronic devices 102a-102d. In addition, local network outlier detection module 130 can be configured to understand the behavior of electronic device 102e-102g and identify suspicious activity by recognizing low prevalence outliers or anomaly behavior from electronic devices 102e-102g. Metadata database 120 can include metadata for each object in the system to facilitate the understanding of the behavior of objects on the system. In an example, metadata database 120 can include the prevalence and age of each outlier discovered in communication system 100a and 100b or the common prevalence and age (if possible) of common know outliers that might be present in communication system 100a and 100b.

Outlier detection module 114 and network outlier detection module 124 can use metadata database 120 to determine the low prevalence outliers and when the low prevalence outliers may indicate malicious activity from a devices, processes, or objects. For example, outlier detection module 114 and network outlier detection module 124 can be configured to monitor activities of objects in communication system 100a and 100b (e.g., electronic devices 102a-102g, processes 116a-116c, hardware 118a and 118b, peripherals 122a and 122b, etc.), compare the monitored activities to metadata for the system, and identify low prevalence outliers to detect potentially malicious activity. In an example, the monitored activities can include an analysis of metadata of the objects (e.g., electronic devices, processes, hardware, peripherals, etc.) in the system to identify polymorphic threats. More specifically, object metadata from multiple systems can be compared to facilitate the identification of polymorphic threats by identifying indicators of polymorphism such as file name reuse, similar fingerprints but different hashes on objects that are otherwise identical, etc. Polymorphic object are similar to another object but differ only slightly in areas of file geometry, file cryptographic hashes, etc. and the difference can be an indication of how the object is presented on each system. The monitored activities could also include an object reuse analysis of the system to detect an object reusing metadata from another object. For example, a low prevalent object reusing metadata such as filename that is used by prevalent objects but otherwise the low prevalent object is very different (e.g., svchost.exe is a common filename that is reused by malicious applications). An age of the low prevalence outliers can be at least partially used to detect potentially malicious activity. In an example, the prevalence and age of each outlier can be determined by outlier detection module 114 and/or network outlier detection module 124 and a relatively prevalent, young outlier can be an indication of malicious activity.

Elements of FIG. 1 may be coupled to one another through one or more interfaces employing any suitable connections (wired or wireless), which provide viable pathways for network (e.g., network 108, local network 128, etc.) communications. Additionally, any one or more of these elements of FIG. 1 may be combined or removed from the architecture based on particular configuration needs. Communication system 100a and 100b may include a configuration capable of transmission control protocol/Internet protocol (TCP/IP) communications for the transmission or reception of packets in a network. Communication system 100a and 100b may also operate in conjunction with a user datagram protocol/IP (UDP/IP) or any other suitable protocol where appropriate and based on particular needs.

For purposes of illustrating certain example techniques of communication systems 100a and 100b, it is important to understand the communications that may be traversing the network environment. The following foundational information may be viewed as a basis from which the present disclosure may be properly explained.

Currently, malware often attempts to hide itself by mimicking objects which are expected to be found in the environment in which the malware is operating. The objects the malware may mimic can be a variety of metadata, filename, process name, file properties, registry keys, etc. This technique often works well for hiding malware from users and administrators. What is needed is a way to be able to exploit the process of mimicry used by malware to detect and identify the malware.

A communication system for anomaly detection to identify malware, as outlined in FIGS. 1A and 1B, can resolve these issues (and others). Communication systems 100a and 100b may be configured to use a centralized data store (e.g., metadata database 120) to identify metadata of common applications and processes to identify outliers. A detection algorithm can work with the centralized data store (e.g., metadata database 120) to find highly prevalent uniform objects in an environment and look for low prevalence outliers to identify potentially malicious objects. This process is similar to what a human researcher would go through when looking at unusual behavior on a system and can allow communication systems 100a and 100b to automate this type of logic on a scale that researchers and administrators are incapable achieving.

Using a centralized data store (e.g., metadata database 120) to identify metadata outliers, outlier detection module 114 and local network outlier detection module 130 can identify highly prevalent uniform objects in communication systems 100a and 100b and look for low prevalence outliers to identify potentially malicious objects. Analysis of communication systems 100a and 100b or a portion of communication systems 100a and 100b can be a schedule process looking for outliers to objects which are highly prevalent and historically have few if any outliers. (e.g., MSIExec is always signed, and one unique instance of MSIExec not being signed appeared during the last analysis which may indicate malicious activity). An extension of this is to look at the superset of new outliers in context, for example, if a single system had a VSE or HIPs threat event during the last analysis and outlier detection module 114 identified 17 highly unusual outliers, then the system is most likely experiencing malicious activity. The analysis can also be on-demand such as a response to a query from an electronic device. The query could be in response to potentially malicious behavior on a device or network and the query could be used to validate the location of potentially malicious or usual behavior in communication systems 100a and 100b. For example, if network outlier detection module 124 is detecting an unusual amount of outlier activity from a local network, local network outlier detection module 130 may be able to trace the unusually high outlier activity to electronic device 102e. Electronic device 102e may include outlier detection module 114 and can trace the source of the unusually high outlier activity to a process, peripheral, or hardware.

The analysis by outlier detection module 114 and local network outlier detection module 130 can be polymorphic where every other instance of a binary in the environment is validly signed. The analysis may also be looking for object reuse where an autorun registry key is a unique value that does not match others in the environment. For example, target files for an autorun registry key are signed by Adobe and the target binary in question is unique and unsigned. The analysis can also include a filename. For example, a commonly used file (e.g., msiexec.exe) is in unique location and has unique binary properties (e.g., packed/unpacked, 32/64 bit, etc.). In an example, combinations of logic can be done by outlier detection module 114 and local network outlier detection module 130. Some properties are intended to be dynamic and not ubiquitous (e.g., file version info) and it is unlikely that an otherwise identical binary would change from native Win32 to a .NET file structure. In an example, a logic engine can be configured to weight changes in metadata differently.

In an embodiment, network outlier detection module 124 and local network outlier detection module 130 can be configured to passively listening to network traffic and monitoring the network traffic going to and from each electronic device. In an example, one or more electronic devices in a network (e.g. electronic devices 102a-102d) could each include outlier detection module 114 to monitor the network traffic and to provide alerts based on the network traffic going to and from each electronic device. In another example, a central network gateway device (e.g., electronic device 102h) could use local network outlier detection module 130 to monitor the traffic and to automatically act on suspicious behavior in addition to providing information alerts.

Turning to the infrastructure of FIGS. 1A and 1B, communication systems 100a and 100b in accordance with an example embodiment is shown. Generally, communication systems 100a and 100b can be implemented in any type or topology of networks. Network 108 represents a series of points or nodes of interconnected communication paths for receiving and transmitting packets of information that propagate through communication systems 100a and 100b. Network 108 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication. Local network 128 represents a series of points or nodes of interconnected communication paths for receiving and transmitting packets of information that propagate through electronic devices 102e-102g. Local network 128 offers a communicative interface between nodes, and may be configured as any local area network (LAN), virtual local area network (VLAN), and any other appropriate architecture or system that facilitates communications in a network environment, or any suitable combination thereof, including wired and/or wireless communication.

In communication systems 100a and 100b, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication systems 100a and 100b. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, electronic devices 102a-102h, cloud services 104, and server 106 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication systems 100a and 100b, each of electronic devices 102a-102h, cloud services 104, and server 106 can include memory elements for storing information to be used in the operations outlined herein. Each of electronic devices 102a-102h, cloud services 104, and server 106 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication systems 100a and 100b could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication systems 100a and 100b, such as electronic devices 102a-102h, cloud services 104, and server 106 may include software modules (e.g., outlier detection module 114 and network outlier detection module 124) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of electronic devices 102a-102h, cloud services 104, and server 106 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Electronic devices 102a-102h can each be a network element and includes, for example, desktop computers, laptop computers, mobile devices, personal digital assistants, smartphones, tablets, or other similar devices. Cloud services 104 is configured to provide cloud services to electronic devices 102a-h. Cloud services 104 may generally be defined as the use of computing resources that are delivered as a service over a network, such as the Internet. Typically, compute, storage, and network resources are offered in a cloud infrastructure, effectively shifting the workload from a local network to the cloud network. Server 106 can be a network element such as a server or virtual server and can be associated with clients, customers, endpoints, or end users wishing to initiate a communication in communication systems 100a and 100b via some network (e.g., network 108). The term 'server' is inclusive of devices used to serve the requests of clients and/or perform some computational task on behalf of clients within communication systems 100a and 100b. Although outlier detection module 114 is represented in FIG. 1A as being located in electronic devices 102a a, this is for illustrative purposes only. Outlier detection module 114 could be combined or separated in any suitable configuration. In addition, although local network outlier detection module 130 is represented in FIG. 1B as being location in electronic device 102h, this is for illustrative purposes only. Local network outlier detection module 130 could be combined or separated in any suitable configuration. Furthermore, outlier detection module 114 and local network outlier detection module 130 could each be integrated with or distributed in another network accessible by electronic devices 102a-f such as cloud services 104 or server 106.

Figure 2:
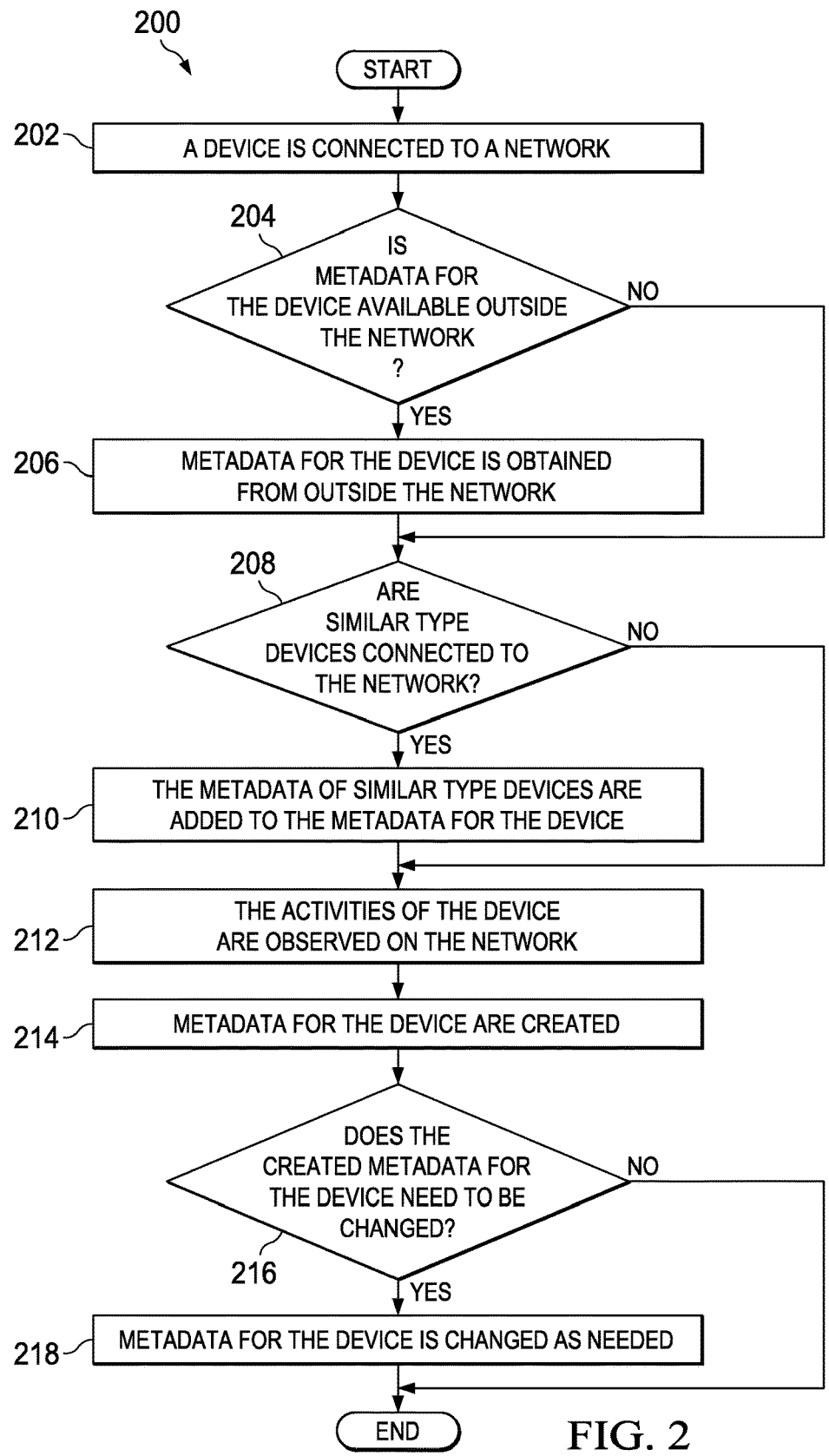
FIG. 2 is a simplified flowchart illustrating potential operations that may be associated with the communication system in accordance with an embodiment.

Turning to FIG. 2, FIG. 2 is an example flowchart illustrating possible operations of a flow 200 that may be associated with anomaly detection to identify malware, in accordance with an embodiment. In an embodiment, one or more operations of flow 200 may be performed by outlier detection module 114, local network outlier detection module 130 and network outlier detection module 124. At 202, a device is connected to a network. At 204, the system determines if metadata for the device is available outside the network. For example, the system may determine if prevalence, age, and other metadata for the device is available outside the network. If metadata for the device is not available outside the network, then the system determines if similar type devices are connected to the network, as in 208. If metadata for the device is available outside the network, then the metadata for the device is obtained from outside the network, as in 206. At 208, the system determines if similar type devices are connected to the network.

If similar type devices are not connected to the network, then the activates of the device are observed on the network, as in 212. If similar type devices are connected to the network, then the metadata of similar type devices are added to the metadata for the device. At 212, the activates of the device are observed on the network.

At 214, metadata from the device is created. At 216, the system determines if the created metadata for the device needs to be changed. If the created metadata for the device need to be changed, then the metadata for the device is changed as needed, as in 218. If the created metadata for the device does not need to be changed, then the flow ends and the metadata for the device is not changed.

Figure 3:
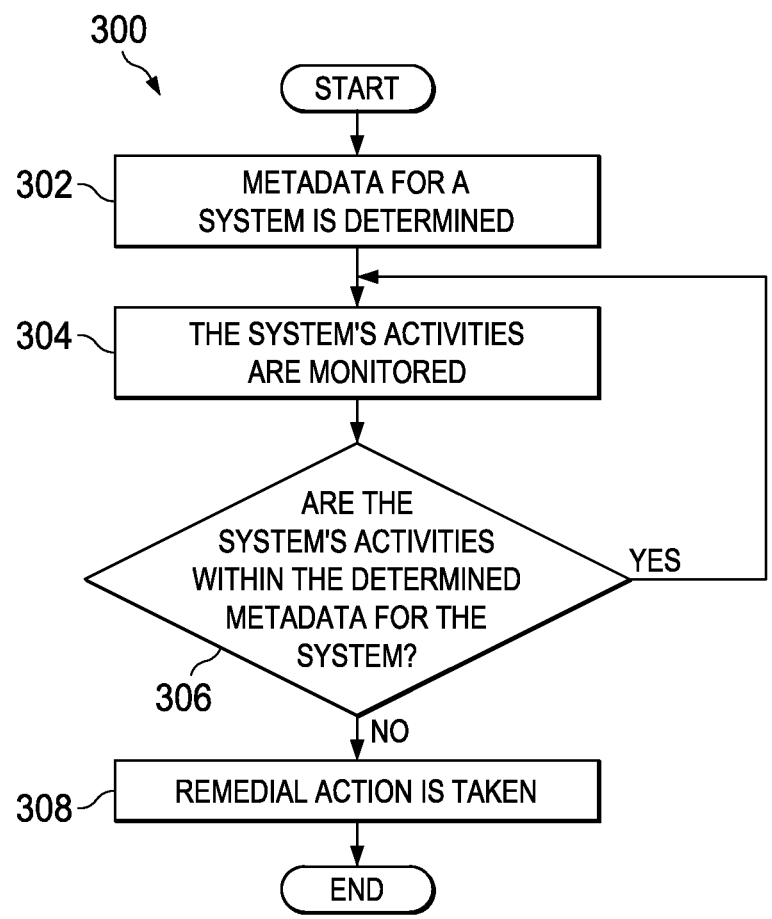
FIG. 3 is a simplified flowchart illustrating potential operations that may be associated with the communication system in accordance with an embodiment.

Turning to FIG. 3, FIG. 3 is an example flowchart illustrating possible operations of a flow 300 that may be associated with anomaly detection to identify malware, in accordance with an embodiment. In an embodiment, one or more operations of flow 300 may be performed by outlier detection module 114, local network outlier detection module 130 and network outlier detection module 124. At 302, metadata for a system is determined. At 304, the system's activities are monitored. At 306, the system determines if the system's activities are within the determined metadata for the system. If the system's activities are within the determined metadata for the system (e.g., no outliers), then the system's activities continue to be monitored, as in 304. If the system's activities are not within the determined metadata for the system (e.g., outliers are present), then remedial action is taken, as in 306. For example, the remedial action may be to scan the system for malware or to trace the source or reason as to why the system's activities are not within the determined metadata for the system.

Figure 4:
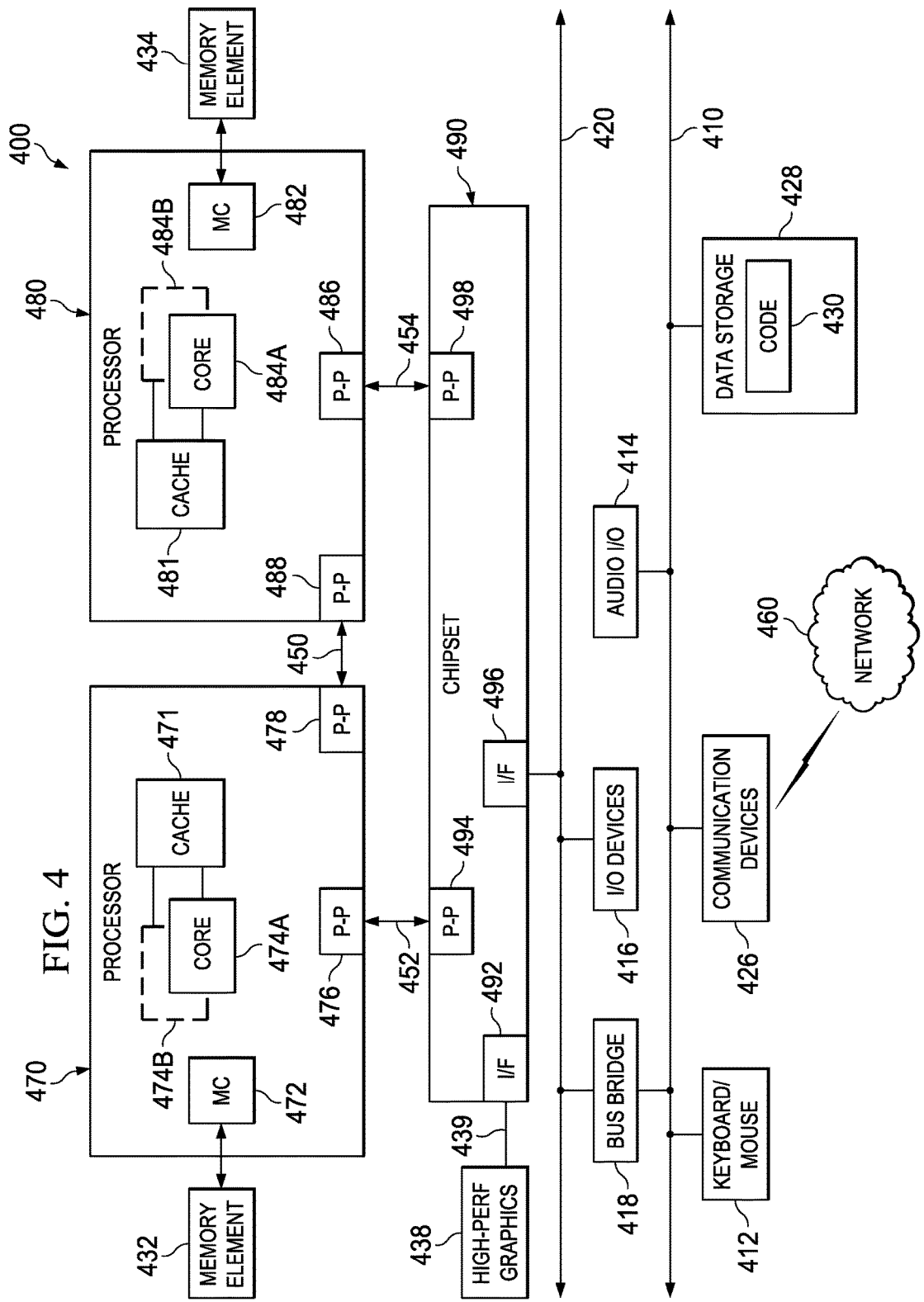
FIG. 4 is a block diagram illustrating an example computing system that is arranged in a point-to-point configuration in accordance with an embodiment.

FIG. 4 illustrates a computing system 400 that is arranged in a point-to-point (PtP) configuration according to an embodiment. In particular, FIG. 4 shows a system where processors, memory, and input/output devices are interconnected by a number of point-to-point interfaces. Generally, one or more of the network elements of communication system 10 may be configured in the same or similar manner as computing system 400.

As illustrated in FIG. 4, system 400 may include several processors, of which only two, processors 470 and 480, are shown for clarity. While two processors 470 and 480 are shown, it is to be understood that an embodiment of system 400 may also include only one such processor. Processors 470 and 480 may each include a set of cores (i.e., processor cores 474A and 474B and processor cores 484A and 484B) to execute multiple threads of a program. The cores may be configured to execute instruction code in a manner similar to that discussed above with reference to FIGS. 1-3. Each processor 470, 480 may include at least one shared cache 471, 481. Shared caches 471, 481 may store data (e.g., instructions) that are utilized by one or more components of processors 470, 480, such as processor cores 474 and 484.

Processors 470 and 480 may also each include integrated memory controller logic (MC) 472 and 482 to communicate with memory elements 432 and 434. Memory elements 432 and/or 434 may store various data used by processors 470 and 480. In alternative embodiments, memory controller logic 472 and 482 may be discreet logic separate from processors 470 and 480.

Processors 470 and 480 may be any type of processor and may exchange data via a point-to-point (PtP) interface 450 using point-to-point interface circuits 478 and 488, respectively. Processors 470 and 480 may each exchange data with a chipset 490 via individual point-to-point interfaces 452 and 454 using point-to-point interface circuits 476, 486, 494, and 498. Chipset 490 may also exchange data with a high-performance graphics circuit 438 via a high-performance graphics interface 439, using an interface circuit 492, which could be a PtP interface circuit. In alternative embodiments, any or all of the PtP links illustrated in FIG. 4 could be implemented as a multi-drop bus rather than a PtP link.

Chipset 490 may be in communication with a bus 420 via an interface circuit 496. Bus 420 may have one or more devices that communicate over it, such as a bus bridge 418 and I/O devices 416. Via a bus 410, bus bridge 418 may be in communication with other devices such as a keyboard/mouse 412 (or other input devices such as a touch screen, trackball, etc.), communication devices 426 (such as modems, network interface devices, or other types of communication devices that may communicate through a computer network 460), audio I/O devices 414, and/or a data storage device 428. Data storage device 428 may store code 430, which may be executed by processors 470 and/or 480. In alternative embodiments, any portions of the bus architectures could be implemented with one or more PtP links.

The computer system depicted in FIG. 4 is a schematic illustration of an embodiment of a computing system that may be utilized to implement various embodiments discussed herein. It will be appreciated that various components of the system depicted in FIG. 4 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 5:
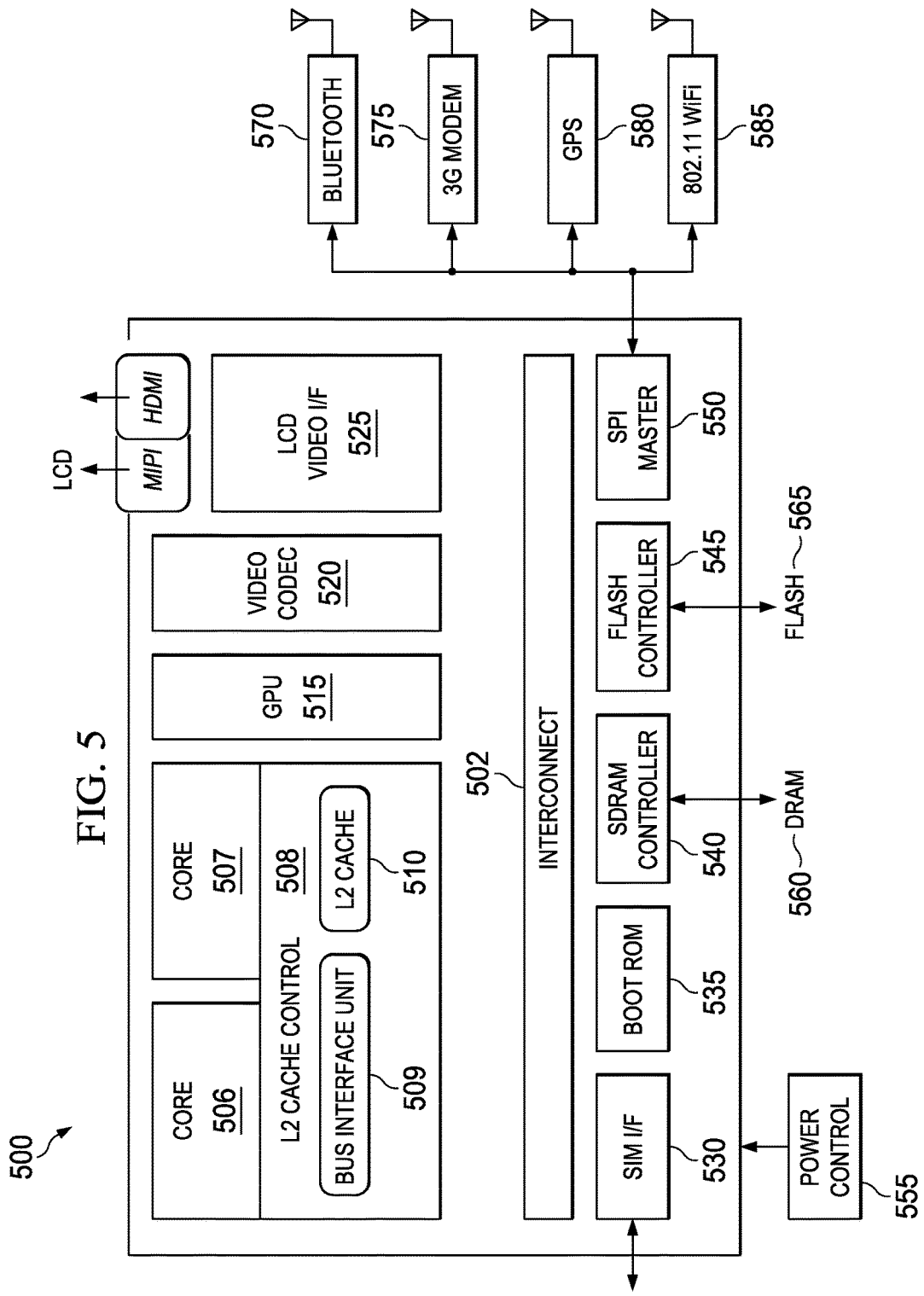
FIG. 5 is a simplified block diagram associated with an example ARM ecosystem system on chip (SOC) of the present disclosure.

Turning to FIG. 5, FIG. 5 is a simplified block diagram associated with an example ARM ecosystem SOC 500 of the present disclosure. At least one example implementation of the present disclosure can include the anomaly detection features discussed herein and an ARM component. For example, the example of FIG. 5 can be associated with any ARM core (e.g., A-7, A-15, etc.). Further, the architecture can be part of any type of tablet, smartphone (inclusive of Android™ phones, iPhones™), iPad™, Google Nexus™, Microsoft Surfacer™, personal computer, server, video processing components, laptop computer (inclusive of any type of notebook), Ultrabook™ system, any type of touch-enabled input device, etc.

In this example of FIG. 5, ARM ecosystem SOC 500 may include multiple cores 506-507, an L2 cache control 508, a bus interface unit 509, an L2 cache 510, a graphics processing unit (GPU) 515, an interconnect 502, a video codec 520, and a liquid crystal display (LCD) I/F 525, which may be associated with mobile industry processor interface (MIPI)/high-definition multimedia interface (HDMI) links that couple to an LCD.

ARM ecosystem SOC 500 may also include a subscriber identity module (SIM) I/F 530, a boot read-only memory (ROM) 535, a synchronous dynamic random access memory (SDRAM) controller 540, a flash controller 545, a serial peripheral interface (SPI) master 550, a suitable power control 555, a dynamic RAM (DRAM) 560, and flash 565. In addition, one or more example embodiments include one or more communication capabilities, interfaces, and features such as instances of Bluetooth™ 570, a 3G modem 575, a global positioning system (GPS) 580, and an 802.11 Wi-Fi 585.

In operation, the example of FIG. 5 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 6:
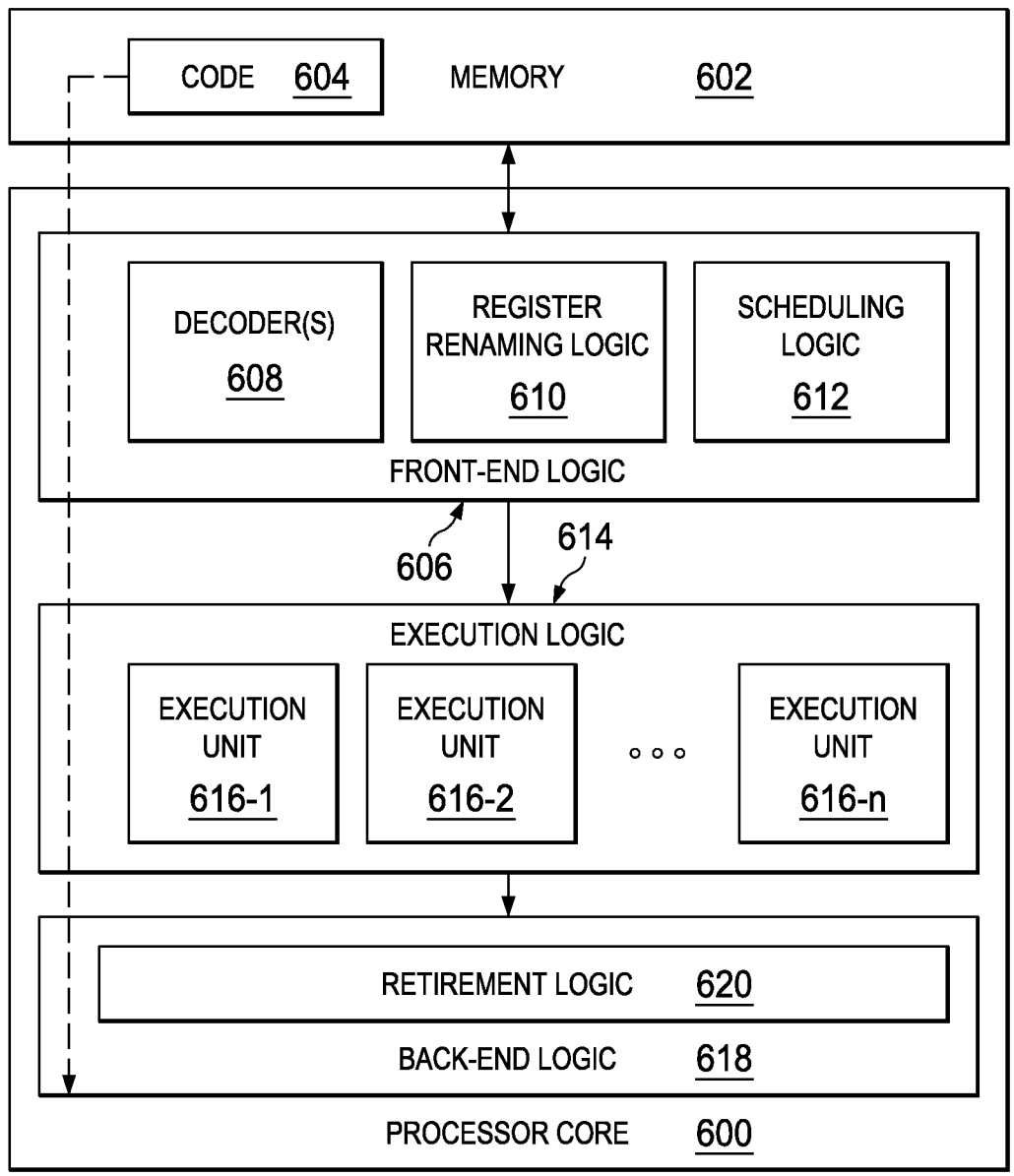
FIG. 6 is a block diagram illustrating an example processor core in accordance with an embodiment.

FIG. 6 illustrates a processor core 600 according to an embodiment. Processor core 600 may be the core for any type of processor, such as a micro-processor, an embedded processor, a digital signal processor (DSP), a network processor, or other device to execute code. Although only one processor core 600 is illustrated in FIG. 6, a processor may alternatively include more than one of the processor core 600 illustrated in FIG. 6. For example, processor core 600 represents one example embodiment of processors cores 474a, 474b, 484a, and 484b shown and described with reference to processors 470 and 480 of FIG. 4. Processor core 600 may be a single-threaded core or, for at least one embodiment, processor core 600 may be multithreaded in that it may include more than one hardware thread context (or "logical processor") per core.

FIG. 6 also illustrates a memory 602 coupled to processor core 600 in accordance with an embodiment. Memory 602 may be any of a wide variety of memories (including various layers of memory hierarchy) as are known or otherwise available to those of skill in the art. Memory 602 may include code 604, which may be one or more instructions, to be executed by processor core 600. Processor core 600 can follow a program sequence of instructions indicated by code 604. Each instruction enters a front-end logic 606 and is processed by one or more decoders 608. The decoder may generate, as its output, a micro operation such as a fixed width micro operation in a predefined format, or may generate other instructions, microinstructions, or control signals that reflect the original code instruction. Front-end logic 606 also includes register renaming logic 610 and scheduling logic 612, which generally allocate resources and queue the operation corresponding to the instruction for execution.

Processor core 600 can also include execution logic 614 having a set of execution units 616-1 through 616-N. Some embodiments may include a number of execution units dedicated to specific functions or sets of functions. Other embodiments may include only one execution unit or one execution unit that can perform a particular function. Execution logic 614 performs the operations specified by code instructions.

After completion of execution of the operations specified by the code instructions, back-end logic 618 can retire the instructions of code 604. In one embodiment, processor core 600 allows out of order execution but requires in order retirement of instructions. Retirement logic 620 may take a variety of known forms (e.g., re-order buffers or the like). In this manner, processor core 600 is transformed during execution of code 604, at least in terms of the output generated by the decoder, hardware registers and tables utilized by register renaming logic 610, and any registers (not shown) modified by execution logic 614.

Although not illustrated in FIG. 6, a processor may include other elements on a chip with processor core 600, at least some of which were shown and described herein with reference to FIG. 6. For example, as shown in FIG. 6, a processor may include memory control logic along with processor core 600. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication systems 100a and 100b and their teachings are readily scalable and can accommodate a large number of components, as well as more complicated/sophisticated arrangements and configurations. Accordingly, the examples provided should not limit the scope or inhibit the broad teachings of communication systems 100a and 100b as potentially applied to a myriad of other architectures.

It is also important to note that the operations in the preceding flow diagrams (i.e., FIGS. 2 and 3) illustrate only some of the possible correlating scenarios and patterns that may be executed by, or within, communication systems 100a and 100b. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems 100a and 100b in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication systems 100a and 100b have been illustrated with reference to particular elements and operations that facilitate the communication process, these elements and operations may be replaced by any suitable architecture, protocols, and/or processes that achieve the intended functionality of communication systems 100a and 100b.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

Example C1 is at least one machine readable medium having one or more instructions that when executed by at least one processor, cause the at least one processor to monitor activities of objects in a system, compare the monitored activates to metadata of the system, and identify low prevalence outliers to detect potentially malicious activity.

In Example C2, the subject matter of Example C1 can optionally include where comparing the monitored activities to metadata for the system includes an analysis of metadata of the objects in the system to identify polymorphic threats.

In Example C3, the subject matter of any one of Examples C1-C2 can optionally include where comparing the monitored activities to metadata for the system includes an object reuse analysis of the system to detect an object reusing metadata from another object.

In Example C4, the subject matter of any one of Examples C1-C3 can optionally include where an age of the low prevalence outliers is at least partially used to detect the potentially malicious activity.

In Example C5, the subject matter of any one of Examples C1-C4 can optionally include where the monitored activities include a filename analysis of the system.

In Example C6, the subject matter of any one of Example C1-C5 can optionally include where the potentially malicious activity is associated with an object and the object is scanned for malware.

In Example C7, the subject matter of any one of Examples C1-C6 can optionally include where the metadata for the system is created from previous activities monitored on the system.

In Example C8, the subject matter of any one of Examples C1-C7 can optionally include where the metadata for the system is at least partially based on other metadata for similar systems.

In Example A1, an electronic device can include an outlier detection module, where the outlier detection module is configured to monitor activities of objects in a system, compare the monitored activities to metadata for the system, and identify low prevalence outliers to detect potentially malicious activity.

In Example, A2, the subject matter of Example A1 can optionally include where comparing the monitored activities to metadata for the system includes an analysis of metadata of the objects in the system to identify polymorphic threats.

In Example A3, the subject matter of any one of Examples A1-A2 can optionally include where comparing the monitored activities to metadata for the system includes an object reuse analysis of the system to detect an object reusing metadata from another object.

In Example A4, the subject matter of any one of Examples A1-A3 can optionally include where an age of the low prevalence outliers is at least partially used to detect the malicious activity.

In Example A5, the subject matter of any one of Examples A1-A4 can optionally include where the monitored activities include a filename analysis of the system.

In Example A6, the subject matter of any one of Examples A1-A5 can optionally include where the potentially malicious activity is associated with an object and the object is scanned for malware.

In Example A7, the subject matter of any one of Examples A1-A6 can optionally include where the metadata for the system are created from previous activities monitored on the system.

In Example A8, the subject matter of any one of Examples A1-A7 can optionally include where the metadata for the system are at least partially based on other metadata for similar systems.

Example M1 is a method including monitoring activities of objects in a system, comparing the monitored activities to metadata for the system, and identifying low prevalence outliers to detect potentially malicious activity.

In Example M2, the subject matter of Example M1 can optionally include where comparing the monitored activities to metadata for the system includes an analysis of metadata of the objects on the system to identify polymorphic threats.

In Example M3, the subject matter of any one of the Examples M1-M2 can optionally include where comparing the monitored activities to metadata for the system includes an object reuse analysis of the system to detect an object reusing metadata from another object.

In Example M4, the subject matter of any one of the Examples M1-M3 can optionally include where an age of the low prevalence outliers is at least partially used to detect the potentially malicious activity.

In Example M5, the subject matter of any one of the Examples M1-M4 can optionally include where the monitored activities include a filename analysis of the system.

In Example M6, the subject matter of any one of the Examples M1-M5 can optionally include associating the potentially malicious activity with an object and scanning the potentially malicious object for malware.

In Example M7, the subject matter of any one of the Examples M1-M6 can optionally include where the metadata for the system is created from previous activities monitored on the system.

Example S1 is a system for anomaly detection to identify malware, the system including an outlier detection module configured to monitor activities of objects in a system, compare the monitored activities to metadata for the system, and identify low prevalence outliers to detect potentially malicious activity.

In Example S2, the subject matter of Example S1 can optionally include where comparing the monitored activities to metadata for the system includes an analysis of metadata of the objects in the system to identify polymorphic threats, an object reuse analysis of the system to detect an object reusing metadata from another object, and a filename analysis of the system.

Example X1 is a machine-readable storage medium including machine-readable instructions to implement a method or realize an apparatus as in any one of the Examples A1-A8, or M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory machine readable medium comprising one or more instructions that when executed by a processor, cause the processor to:
    create, by the processor, metadata for a system;
    store, in memory, the metadata for the system;
    monitor activities of a highly prevalent object in the system, wherein the highly prevalent object is a process, a peripheral, or hardware on an electronic device in the system;
    compare the monitored activities to the metadata for the system stored in memory, wherein comparing the monitored activities to the metadata for the system includes an analysis of metadata of the highly prevalent object to identify a polymorphic threat, an object reuse analysis of the system to detect whether the highly prevalent object is reusing metadata from another object, and a filename analysis of the system;
    identify a low prevalence outlier to detect potentially malicious activity, wherein the low prevalence outlier mimics metadata of the highly prevalent object and appears as an anomaly in other metadata of the highly prevalent object; and
    in response to identifying the low prevalence outlier of the highly prevalent object, scanning the low prevalence outlier of the highly prevalent object for malware.

2. The at least one non-transitory machine readable medium of claim 1, wherein an age of the low prevalence outlier is at least partially used to detect the potentially malicious activity.

3. The at least one non-transitory machine readable medium of claim 1, wherein the metadata of the highly prevalent object mimicked by the low prevalence outlier includes one or more of a filename, a process name, file properties, a fingerprint, and a registry key.

4. The at least one non-transitory machine readable medium of claim 1, wherein the metadata for the system is created from previous activities monitored on the system.

5. The at least one non-transitory machine readable medium of claim 1, wherein the metadata for the system is at least partially based on other metadata for similar systems.

6. An apparatus comprising:
    a memory element; and
    a hardware processor configured to:
        create metadata for a system;
        store, in the memory element, the metadata for the system;
        monitor activities of a highly prevalent object in the system, wherein the highly prevalent object is a process, a peripheral, or hardware on an electronic device in the system;
        compare the monitored activities to the metadata for the system stored in the memory element, wherein comparing the monitored activities to the metadata for the system includes an analysis of metadata of the highly prevalent object to identify a polymorphic threat, an object reuse analysis of the system to detect whether the highly prevalent object is reusing metadata from another object, and a filename analysis of the system;
        identify a low prevalence outlier to detect potentially malicious activity, wherein the low prevalence outlier mimics metadata of the highly prevalent object and appears as an anomaly in other metadata of the highly prevalent object; and
        in response to identifying the low prevalence outlier of the highly prevalent object, scan the low prevalence outlier of the highly prevalent object for malware.

7. The apparatus of claim 6, wherein an age of the low prevalence outlier is at least partially used to detect the potentially malicious activity.

8. The apparatus of claim 6, wherein metadata of the highly prevalent object mimicked by the low prevalence outlier includes one or more of a filename, a process name, file properties, a fingerprint, and a registry key.

9. The apparatus of claim 6, wherein the metadata for the system is created from previous activities monitored on the system.

10. The apparatus of claim 6, wherein the metadata for the system is at least partially based on other metadata for similar systems.

11. A method comprising:
creating metadata for a system;
storing the metadata for the system;
monitoring activities of a highly prevalent object in the system, wherein the highly prevalent object is a process, a peripheral, or hardware on an electronic device in the system;
comparing the monitored activities to the metadata for the system, wherein comparing the monitored activities to the metadata for the system includes an analysis of metadata of the highly prevalent object to identify a polymorphic threat, an object reuse analysis of the system to detect whether the highly prevalent object is reusing metadata from another object, and a filename analysis of the system;
identifying a low prevalence outlier to detect potentially malicious activity, wherein the low prevalence outlier mimics metadata of the highly prevalent object and appears as an anomaly in other metadata of the highly prevalent object: and
in response to identifying the low prevalence outlier of the highly prevalent object, scanning the low prevalence outlier of the highly prevalent object for malware.

12. The method of claim 11, wherein an age of the low prevalence outlier is at least partially used to detect the potentially malicious activity.

13. The method of claim 11, wherein metadata of the highly prevalent object mimicked by the low prevalence outlier includes one or more of a filename, a process name, file properties, a fingerprint, and a registry key.

14. The method of claim 11, wherein the metadata for the system is created from previous activities monitored on the system.

15. A system for anomaly detection to identify malware, the system comprising:
memory; and
a hardware processor configured to:
create metadata for a system;
store, in memory, the metadata for the system;
monitor activities of a highly prevalent object in the system, wherein the highly prevalent object is a process, a peripheral, or hardware on an electronic device in the system;
compare the monitored activities to the metadata for the system stored in memory, wherein comparing the monitored activities to the metadata for the system includes an analysis of metadata of the highly prevalent object to identify a polymorphic threat, an object reuse analysis of the system to detect whether the highly prevalent object is reusing metadata from another object, and a filename analysis of the system; and
identify a low prevalence outlier to detect potentially malicious activity, wherein the low prevalence outlier mimics metadata of the highly prevalent object and appears as an anomaly in other metadata of the highly prevalent object; and
in response to identifying the low prevalence outlier of the highly prevalent object, scan the low prevalence outlier of the highly prevalent object for malware.

* * * * *